Dec. 8, 1959   C. P. ORR   2,916,174
DUAL SEAL CLOSURE GASKET
Filed July 21, 1955
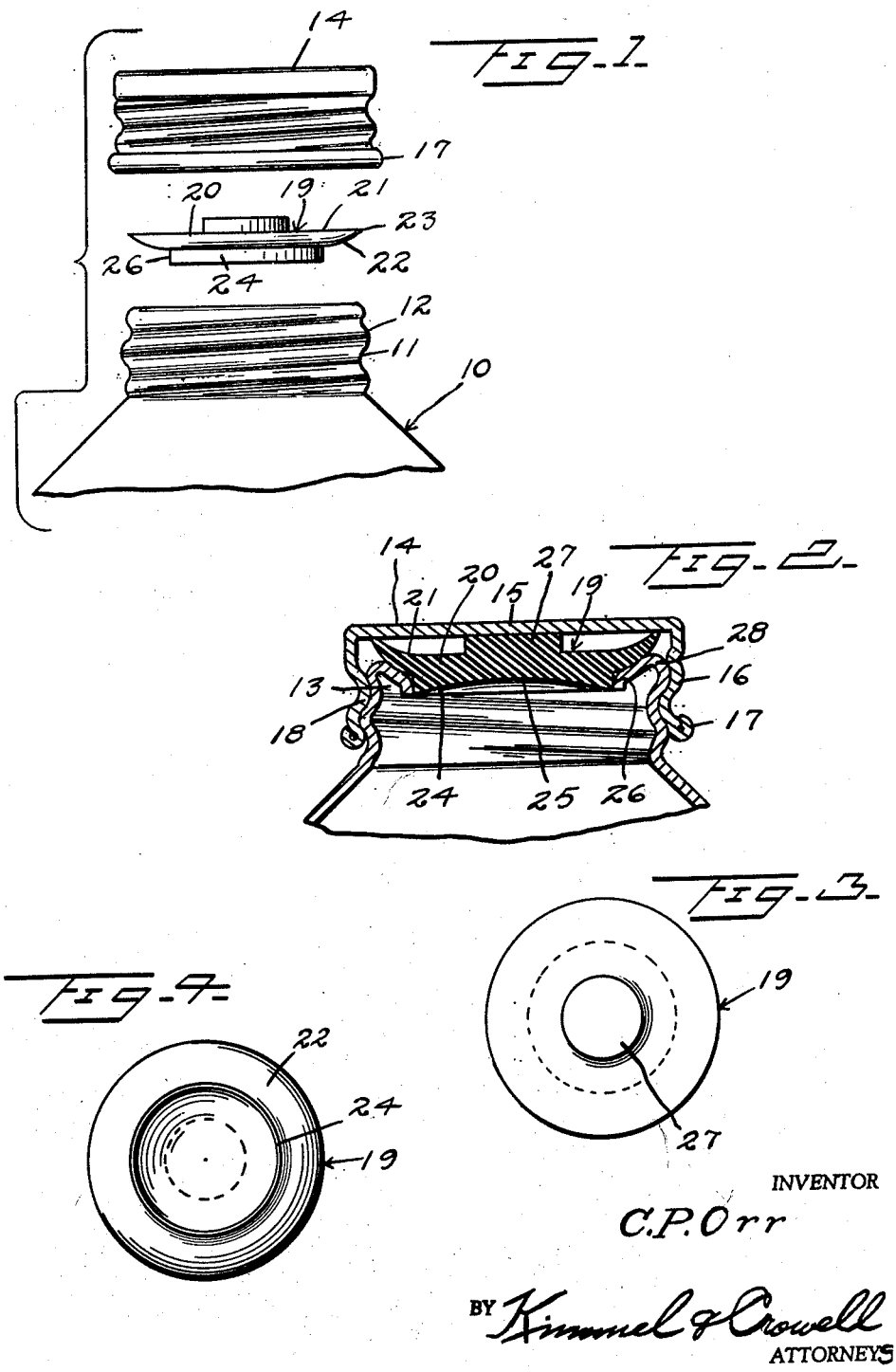
INVENTOR
*C.P. Orr*
BY *Kimmel & Crowell*
ATTORNEYS

United States Patent Office 2,916,174
Patented Dec. 8, 1959

2,916,174

DUAL SEAL CLOSURE GASKET

Charles P. Orr, Camden, N.J., assignor to Spray Products Corporation, Camden, N.J., a corporation of New Jersey Application July 21, 1955, Serial No. 523,494

1 Claim. (Cl. 215—43)

The present invention relates to dual seal closure gaskets, and more particularly to resilient gasket devices which are adapted to provide both a lateral and vertical seal between a vessel top and cap therefor.

The primary object of the invention is to provide a dual seal closure gasket which is particularly efficient in sealing vessels containing highly volatile fluids such as the extremely highly volatile hydrocarbon fluids.

Another object of the invention is to provide a gasket structure formed from Neoprene, other synthetic rubbers, natural rubber, suitable plastics, or like materials which are normally elastic and adapted to seal fluids and gases.

A further object of the invention is to provide a dual seal closure gasket of the type described above, in which the structure of the gasket is such that both a lateral and vertical sealing action is enhanced by the action of the container cap on the gasket structure.

A still further object of the invention is to provide a structure of the class described which is inexpensive to manufacture, extremely simple to use and highly efficient in operation.

Other objects and advantages will become apparent in the following specification when considered in the light of the attached drawings, in which:

Figure 1 is an exploded side elevation of the top of the container, the gasket and the cap adapted to cooperate therewith;

Figure 2 is an enlarged fragmentary vertical cross section of the container, showing the gasket in sealing position under the cap;

Figure 3 is a top plan view of the gasket, and

Figure 4 is a bottom plan view of the gasket.

Referring now to the drawings in detail wherein like reference numerals indicate like parts throughout the several figures, the reference numeral 10 indicates generally a container having a reduced neck portion 11 which is formed with external screw threads 12. The neck 11 of the container 12 is inwardly reverted, as at 13, to provide a rolled top edge to the neck 11. The container 10 is provided with conventional side and bottom walls (not shown). A cap 14 is formed with a flat upper surface 15 and a depending circumferential side wall 16. The bottom edge of the side wall 16 is reverted, as at 17, to form a rolled edge. The inner face of the side wall 16 of the cap 14 is formed with screw threads 18 which are adapted to cooperate with the screw threads 12 of the container 10.

A gasket sealing element, generally indicated at 19, consists of a central body portion 20 which is formed with a flat surface 21 and has the outer portions of the opposite surface upwardly curved as at 22 to meet the flat surface 21 at an edge 23. From the side of the gasket 19, opposite the flat surface 21, a cylindrical lateral sealing element 24 projects to a thickness equal to the thickness of the central body portion 20 internally of the point of the beginning of the curved edge 22. The cylindrical lateral sealing element 24 is formed with a concavity 25 extending into the sealing element 24 for approximately half its depth. The outer edge 26 of the sealing element 24 is of a size to permit its insertion between the rolled edges 13 of the container 10.

A pressure plug 27 is formed on the flat surface 21 and projects upwardly therefrom a distance equal to the thickness of the central body portion 20 and to the thickness of the sealing element 24. The pressure plug 27 is formed as a cylindrical member of substantially lesser diameter than the diameter of the sealing element 24. The pressure plug 27, the central body portion 20 and the sealing element 24 are integral and have a common axis. The central body portion 20 is a flange disposed intermediate the pressure plug or centrally disposed pressure portion 27 and the laterally disposed cylindrical sealing element 24.

In the use and operation of the invention, the gasket 19 is inserted in a cap 14 with the pressure plug 27 engaging the wall 15 of the cap 14, the edge 23 of the intermediate flange being in contact with the side wall 16 of the cap 14 and the lateral sealing element 24 projecting away from the top wall 15 of the cap 14, with its side edge 26 spaced apart from the side wall 16 of the cap 14. The cap is then fastened to the neck 11 of a container 10 by screwing the threads 18 onto the threads 12. As the cap 14 seats on the neck 11, the curved surface 22 of the central body portion 20 is brought into engagement with the top edge 28 of the neck 11. Further tightening of the cap 14 on the neck 11 causes the pressure plug 27 to press downwardly on the body portion 20, exerting a sealing pressure between the curved surface 22 and the top edge 28 of the neck 11 and simultaneously forcing the side 26 of the lateral sealing element 24 into sealing engagement with the reverted portion 14 of the neck 11.

Thus it can be seen that both a lateral and a vertical seal is obtained by the pressure of the cap 14 on the pressure plug 27. A dual seal thus obtained, more efficiently maintains liquids and vapors in the container 10 than is possible with a single seal structure.

It should be here emphasized that the gasket seal comprising this invention attains a swell of from about 5% to about 10% over its initial shape, so that the lateral and vertical seal are both intensely enhanced, forming a seal which insofar as its practical application is concerned is completely leakproof, both against vapor and fluid.

Having thus described the preferred form of the invention, it should be understood that numerous structural modifications and adaptations may be resorted to without departing from the scope of the appended claims.

What is claimed is:

A seal comprising a circular body of resilient material having an annular peripheral portion provided with a flat upper annular surface and a circular centrally disposed pressure portion of substantially smaller diameter than the said circular body projecting upwardly from said body and integrally connected with the upper portion of said body and terminating in a flat upper end, a laterally disposed cylindrical sealing element integrally connected with the lower portion of said body and depending beneath said body for a distance substantially equal to the distance said centrally disposed pressure portion projects above said body, said lateral cylindrical sealing element including a cylindrical sealing surface and having a diameter greater than the diameter of said centrally disposed pressure portion and less than the diameter of said circular body with a central concave lower surface beneath said centrally disposed pressure portion, said annular peripheral portion including an outwardly extending flange disposed intermediate said lateral cylindrical sealing element and said centrally disposed pressure portion, said flange having its lower surface disposed beneath the flat upper annular surface of said body, said lower surface of said flange forming an additional annular sealing surface for said body concentric with but spaced from the cylindrical sealing surface of said lateral cylindrical sealing element, the overall depth of said circular body being less than the diameter of said centrally disposed pressure portion.

References Cited in the file of this patent

UNITED STATES PATENTS

| | | |
|---|---|---|
| 1,814,650 | Waite | July 14, 1931 |
| 2,372,227 | Sanford | Mar. 27, 1945 |
| 2,663,451 | Yarnall | Dec. 22, 1953 |
| 2,742,170 | Bramming | Apr. 17, 1956 |

FOREIGN PATENTS

| | | |
|---|---|---|
| 505,504 | Belgium | Sept. 15, 1951 |
| 1,008,909 | France | Feb. 27, 1952 |